United States Patent Office 3,338,946
Patented Aug. 29, 1967

3,338,946
β,β',β''-TRIS(METHYLSULFONYLTHIO)
TRIETHYLAMINE
Joseph E. Dunbar, Midland, Mich., assignor to The Dow Chemical Company, Midland, Mich., a corporation of Delaware
No Drawing. Filed Feb. 28, 1966, Ser. No. 530,319
1 Claim. (Cl. 260—453)

The present invention is directed to β,β',β''-tris(methylsulfonylthio)triethylamine which corresponds to the formula

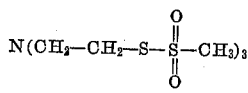

This new compound is a crystalline solid material which is of low solubility in water and of higher solubility in common organic solvents. The β,β',β''-tris(methylsulfonylthio)triethylamine compound has been found to be useful as a pesticide for the control of various arachnid, mollusk and crustacean pests such as two-spotted spider mites, ramshorn snails and Daphnia.

In preparing the new compound of the present invention, β,β',β''-trichlorotriethylamine and potassium methanethiosulfonate are reacted together in the presence on an inert organic solvent. The reaction proceeds readily at temperatures of from 40° to 180° C. with the production of the desired product and the potassium chloride by-product. The proportions of the reactants to be employed are not critical, however, the reaction consumes the reactants in the proportions of 3 moles of potassium methanethiosulfonate for each mole of β,β',β''-trichlorotriethylamine and the use of the reactants in such proportions is preferred. An excess of the potassium methanethiosulfonate reactant can be employed if desired.

In carrying out the preparation of the β,β',β''-tris(methylsulfonylthio)triethylamine compound, the β,β',β''-trichlorotriethylamine and potassium methanethiosulfonate are dispersed in an inert reaction medium and the reaction mixture thus prepared heated at a temperature within the desired temperature range. Representative inert organic solvents include ethanol, methanol, acetone, aqueous ethanol, aqueous methanol, aqueous acetone, dimethyl formamide, dimethyl sulfoxide, dimethylsulfone, tetrahydrofurane, and sulfolane. In a convenient procedure the reaction mixture is heated at the boling temperature and under reflux until there is a substantial cessation in the precipitation of the potassium chloride by-product. Following the reaction period, the solid product and the potassium chloride by-product are separated from the reaction mixture by conventional procedure, such as decantation, filtration or centrifugation. Thereafter the solid material obtained from the reaction mixture is washed with water to remove the potassium chloride by-product. Thereafter the water-insoluble β,β',β''-tris(methylsulfonylthio)triethylamine is dried. This product can be employed in pesticidal compositions or further purified by such conventional procedures as washing or recrystallization before being so employed.

In a representative operation β,β',β''-trichlorotriethylamine (17 grams; 0.0833 mole) and potassium methanethiosulfonate (37.4 grams; 0.249 mole) were dispersed in 500 milliliters of ethanol. The reaction mixture was then heated with stirring at the boiling temperature and under reflux for 3 hours. Following the reaction period the reaction mixture was cooled and filtered to obtain a mixture of the desired product and potassium chloride by-product. Thereafter the filtered solids were washed with water to remove the potassium chloride. The water-insoluble product was separated by filtration, dried, and twice recrystallized from acetonitrile. The recrystallized β,β',β'' - tris(methylsulfonylthio)triethylamine product melted at 121.5°–123° C. Upon combustion analysis, the product was found to have carbon, hydrogen and nitrogen contents of 25.2 percent, 4.92 percent, and 3.24 percent respectively, as compared to the theoretical contents of 25.04 percent, 4.90 percent and 3.25 percent, respectively, calculated for said product.

The compound of the present invention is useful as a pesticide for the control of arachnid, mollusk and crustacean pests. For such use the unmodified compound can be employed. Alternatively, the compound can be dispersed on an inert finely divided solid and the resulting preparation employed as a dust. Also, such preparations can be dispersed in water with or without the aid of a wetting agent and the resulting aqueous dispersions employed as sprays. In other procedures the compound can be employed in oil or in other solvents or as a constituent of solvent-in-water or water-in-solvent emulsions or dispersions thereof which can be applied as a spray, drench or wash. In representative operations aqueous compositions containing β,β',β''-tris(methylsulfonylthio)triethylamine as sole active ingredient at a concentration of two parts per million by weight give complete control and kills of Daphnia. In further operations, similar aqueous compositions containing β,β',β''-tris(methylsulfonylthio)triethylamine at concentrations of 1,500 parts per million by weight give substantially complete kills of two-spotted spider mites when applied to foliage infested with such mites.

I claim:

β,β',β''-tris(methylsulfonythio)triethylamine.

No references cited.

CHARLES B. PARKER, Primary Examiner.
J. BRUST, Assistant Examiner.